3,427,145
METHOD OF AGGLOMERATING POTASSIUM CHLORIDE USING HYDROFLUORIC ACID OR METALLIC FLUORIDE
James R. West, 432 Stratford Road, South Hempstead, N.Y. 11550
No Drawing. Continuation-in-part of application Ser. No. 368,700, May 18, 1964. This application Sept. 22, 1967, Ser. No. 669,727
U.S. Cl. 71—61     3 Claims
Int. Cl. B01j *2/28;* C05d *1/02;* C01d *3/22*

ABSTRACT OF THE DISCLOSURE

A method for agglomerating finely divided fertilizer grade potash material consisting essentially of potassium chloride involving the steps of mixing the fines with a solution containing about 10% by weight of hydrofluoric acid or metallic fluorides in a proportion by weight relative to said potash material of about 2/100, then forming the wetted particles into aggregates by conventional apparatus such as a pelletizing drum, disc or the like and then drying said aggregates at a temperature of about 200–650° C.

---

This application is a continuation-in-part of application Ser. No. 368,700, now abandoned, filed May 18, 1964.

The present invention relates to a process of agglomerating and granulating potassium chloride fines accumulated during the manufacture and handling of fertilizer grade material, for the purpose of rendering such fines into useful granular material suitable for fertilizer application and particularly adapted for easy applicability to soils in presently used fertilizer and drilling devices as customarily used in agriculture.

The term "potash" as used herein refers to material which consists essentially of potassium chloride.

Small particle sizes in potassium chloride salts, for example, below about 65 mesh, are too fine for many uses, but most methods of manufacturing such salts produce a substantial percentage of such sizes. The process of the present invention is primarily concerned with treating such fine sizes, but is also applicable to larger sizes.

Two methods are presently used in the potash industry for agglomeration or manufacture of granular potassium chloride material from fine particles, e.g. from 65 to about 500 mesh. One common method is to dissolve the potassium chloride particles in water or a potassium chloride deficient brine, and then by evaporation of the brine cause recrystallization to occur, and by proper control of crystal growth, to produce granules of the desired size. Since heating of the solutions are required, this method is unduly expensive.

Another method in common use is that of high pressure compaction whereby a mixture of dampened or dried fines is compressed under pressures of from 100,000 to 500,000 pounds per square inch, producing a more or less homogeneous sheet, which is then crushed and screened with recycle of the material finer and coarser than the desired particle size. This method requires careful grading of the compactor feed with regard to selection and quantity of particle sizes so that the feed is as homogeneous as possible, heating of the feed stream to some critical temperature, and the addition of water, steam, brine or some wetting agent to make the feed stream manageable.

The present invention provides a granulating or pelletizing procedure whereby granules or pellets are formed from potash fines, e.g. minus 48 mesh plus 500 mesh, said formed granules being of any desired size, and having required properties of hardness and resistance to attack by atmospheric humidity and natural attrition.

The fines are collected together in a bin from their various sources, such as dust collectors, cyclones, etc., and fed at a desired rate into a pelletizing drum, or onto a pelletizing disc, or other suitable pelletizing device, are sprayed with a dilute inorganic acid or salt solution to provide the dampness for the pelletizing procedure and acid or salt for the subsequent heat treatment step. There are various methods of forming granules or pellets well known to those skilled in the art, and any method of granulation or pelletizing is suitable for use with the present invention.

The aqueous wetting solution according to this invention, containing a percentage of inorganic acid or salt or being wholly made up of commercial inorganic acid, is mixed with the potash fines as or before the granule or pellet is being formed, or is sprayed on the surface of the pellet or granule after it is formed in the apparatus.

Then the treated granules or pellets are subjected to heat treatment at a predetermined elevated temperature, below the fusion point, whereby the granule acquires the hardness desired in the final product.

It has been found that dilute hydrofluoric acid in the amount of 2 grams or less of acid (based on 100% HF) per 100 grams of potassium chloride fines is sufficient to form a stabilized granular particle, although the amount can be varied up or down to provide a harder or softer granule or pellet. The acid moistened granule or pellet is fed to a dryer wherein heat is applied in the temperature range of from about 200° C. to about 650° C. As the potassium chloride particles moistened with the acid are heated, a strong cementing action takes place so that the pellet or granule becomes firm and has a hardness that is equal to the natural potash crystal or to a granule or pellet that has been produced by compaction as described above.

In addition to hydrofluoric acid, the fluorides have similar applicability to the present process, e.g. fluorides of potassium, manganese, copper, iron, etc. may be used depending on the particular utlimate use of the pelletized product.

In the potash industry three normal sizes of potash are marketed. These are called granular, coarse, and standard products and have a Tyler screen size of $-6+14$, $-14+28$, and $-28+48$ mesh, respectively. In the processing operation a considerable amount of fine ($-48$ mesh) material is normally produced which is treated in the compaction or crystallizer units to yield more of the desired granular product.

In the process of the present invention the fines ($-48$ mesh) are run through any one of the conventional well known pelletizing means such as a rotating disc or a balling drum. The fines or the pellets are sprayed or otherwise mixed with an aqueous solution of the salt or acid in a proportion of about 2% by weight of the acid or salt based on the weight of the fines or pellets. The proportion of the acid or salt may be substantially higher if desired but from an economic standpoint, and from the standpoint of technical results, there is generally no need to increase the relative proportions beyond the figure of about 2 or 3%.

The spraying or mixing of the potassium chloride material with the acid or salt solution may be effected prior to, during or after the pelletizing step with apparent equivalent results although ease of processing in a given plant arrangement may make it more feasible to perform the operation at a given point such as at the pelletizing means. In any event best subsequent results are obtained when the potash material and the treating solution are brought together in the most intimate relation by whatever means the treating is accomplished.

In forming and/or moistening the pellets it has been found that too little moisture results in soft, low density, granules of small size and too high a quantity of moisture tends to give a pasty mass which results in too large lumps.

The moist pellets are next subjected to a drying or heat treating step whereby the pellets are subjected to a predetermined elevated temperature (about 200° C. to about 650° C.) below the fusion point of potassium chloride for a time sufficient to dry the material and during which period of time the pellet requires the desired enhanced hardness and wear characteristics. Agitation of the pellets during at least the initial stages of the drying step tends to segregate the pellets and result in a more rounded form, if desired. In general, the drying temperature should preferably be kept at or near the lower end of the above recited range for optimum physical characteristics of the agglomerated product, although in some instances the physical characteristics appear substantially unchanged throughout the temperature range.

The heat treating step may be carried out in any conventional well known fashion either batch-wise or in a continuous manner as desired.

While the precise mechanism of the invention is not known or exactly understood, it is known that there is a chemical reaction with the acids because hydrogen chloride (HCl) is given off during the drying step in detectable quantities from the treated material. The salts formed, or added as such, may be cementing the potash particles together. It is also possible that the salts formed, or added as such, react with the potassium chloride to make complex salts which bind the potassium chloride particles together.

After the heating step the dried treated pellets are screened or otherwise mechanically separated to separate the −6+14 mesh pellets or other desired size, the remaining material being recycled to the earlier stages of the process.

Wear tests were conducted on a representative sample product treated according to the above process steps using on the one hand hydrofluoric acid and on the other hand other agglomerating reagents in order to determine on some relative basis the enhancement of mechanical properties achieved. In preparing each sample of pellets, 200 gram portions of potassium chloride fines were mixed with 40 cc. of solution (10 grams of acid per 100 cc. of solution). After drying at about 200° C. the −6+14 mesh product was screened out and wear tested. The wear test employed involved placing 50 grams of pellets in a laboratory flask with pebbles and rotating the same for fifteen minutes. The material was then screened through 35 mesh, the amount of undersize being regarded as a measure of wear.

The wear test data are tabulated below:

TABLE I

| Test | Solution | Gr. −35 mesh/50 gr. −6+14 | |
|---|---|---|---|
| | | 200° C. | 650° C. |
| 1 | 10% HF | 1.2 | 3.5 |
| 2 | 10% H$_3$PO$_4$ | 2.1 | 4.5 |
| 3 | H$_2$O | 3.0 | 4.9 |

Initial treatment of pellets with hydrofluoric acid showed better resistance to wear than those treated with either phosphoric acid or water, as shown in the above table.

In order to further compare the hydrofluoric acid treated pellets with other pellets, samples of each were placed in a constant humidity cabinet for 150 hours, then removed and wear tested. Results are shown in the following table:

TABLE II

| Test | Solution | Gr.−35 mesh/50 gr.−6+14 | |
|---|---|---|---|
| | | 200° C. | 650° C. |
| 1 | 10% HF | 17.2 | 30.0 |
| 2 | 10% H$_2$PO$_4$ | 35.1 | Disint. |
| 3 | H$_2$O | 30.4 | 23.1 |

The effect of high humidity on all pellets was severe, but the relative resistance to degradation was significantly greater in the case of the hydrofluoric acid treated pellets than for the others.

The present process provides a treated material which is comparable in mechanical properties to that produced by the much more involved and expensive prior art method of compaction, and from all indications the present process provides a means of obtaining more uniform results with less recycling than prior art methods.

While certain embodiments of the invention have been described herein, it is to be understood that variations in the process may be made by those skilled in this particular art without departing from the scope and spirit of the invention.

I claim:

1. A method of agglomerating finely divided potassium chloride comprising the steps of mixing the fines with a solution containing about 10% by weight of an inorganic compound selected from the group consisting of hydrofluoric acid and metallic fluorides the weight ratio of said compound to said potassium chloride being about 2/100, forming the wetted particles into aggregates, and drying said agregates at a predetermined elevated temperature below the fusion temperature of said aggregates.

2. A method of agglomerating finely divided potassium chloride having a mesh size of less than about −48 mesh comprising the steps of mixing the fines with a solution containing about 10% by weight of hydrofluoric acid, the weight ratio of said acid to said potassium chloride being about 2/100, forming the wetted particles into aggregates, and drying said aggregates at about 200–650° C.

3. A method of agglomerating finely divided potassium chloride having a mesh size of less than about −48 mesh comprising the steps of mixing the fines with a solution containing about 10% by weight of potassium fluoride, the weight ratio of said acid to said potassium chloride being about 2/100, forming the wetted particles into aggregates, and drying said aggregates at about 200–650° C.

References Cited

UNITED STATES PATENTS 2,061,534  11/1936  Balt et al.
3,026,194  3/1962   Smith et al. _____ 71—64
2,107,701  2/1938   Haase et al.

DONALL H. SYLVESTER, Primary Examiner.

R. D. BAJEFSKY, Assistant Examiner.

U.S. Cl. X.R.

23—89, 313; 71—63, 64

UNITED STATES PATENT OFFICE
CERTIFICATE OF CORRECTION

Patent No. 3,427,145　　　　　　　　　　　　　　February 11, 1969

James R. West

It is certified that error appears in the above identified patent and that said Letters Patent are hereby corrected as shown below:

Column 4, TABLE II, second column, line 2 thereof, "$H_2PO_4$" should read -- $H_3PO_4$ --.

Signed and sealed this 24th day of March 1970.

(SEAL)
Attest:

Edward M. Fletcher, Jr.　　　　　　　　　WILLIAM E. SCHUYLER, JR
Attesting Officer　　　　　　　　　　　　　　Commissioner of Patents